US012054320B2

(12) United States Patent
Jordan et al.

(10) Patent No.: US 12,054,320 B2
(45) **Date of Patent: *Aug. 6, 2024**

(54) MULTI-CHAMBERED LID APPARATUS WITH REAGENT PORT

(71) Applicant: Cepheid, Sunnyvale, CA (US)

(72) Inventors: Paul Jordan, Millbrae, CA (US); Rohan Kurse, Sunnyvale, CA (US)

(73) Assignee: Cepheid, Sunnyvale, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/733,903

(22) Filed: Apr. 29, 2022

(65) Prior Publication Data

US 2022/0324620 A1 Oct. 13, 2022

Related U.S. Application Data

(63) Continuation of application No. 16/585,660, filed on Sep. 27, 2019, now Pat. No. 11,345,525, which is a (Continued)

(51) Int. Cl.

*B65D 47/08* (2006.01)
*B01L 3/00* (2006.01)
(Continued)

(52) U.S. Cl.

CPC ...... *B65D 47/0857* (2013.01); *B01L 3/50853* (2013.01); *B65D 25/04* (2013.01); *B65D 43/0204* (2013.01); *B65D 47/00* (2013.01); *B65D 51/18* (2013.01); *B01L 2300/043* (2013.01)

(58) Field of Classification Search

CPC ......... B01L 2200/025; B01L 2200/026; B01L 2200/0689; B01L 2200/12; B01L 2300/042; B01L 2300/043; B01L 2300/12; B01L 3/5085; B01L 3/50853; B01L 3/50855; B01L 3/523; B01L 3/527; B65D 11/04; B65D 17/505; B65D 25/04; B65D 2543/0046; B65D 3/268; B65D 41/04; B65D 41/0414; B65D 41/62;
(Continued)

(56) References Cited

U.S. PATENT DOCUMENTS 4,046,288 A 9/1977 Bergman et al.
4,717,042 A 1/1988 McLaughlin et al.
(Continued)

FOREIGN PATENT DOCUMENTS

CN 101365539 A 2/2009
CN 105229136 A 1/2016
(Continued)

*Primary Examiner* — John K Fristoe, Jr.
*Assistant Examiner* — Madison L Poos
(74) *Attorney, Agent, or Firm* — Kilpatrick Townsend & Stockton LLP

(57) ABSTRACT

A lid apparatus for a multi-chambered container. The lid apparatus has a top-lid that is hingedly attached to a bottom-cap. The top-lid includes one or more openings for fluid filling multiple passages that extend from the bottom-cap. A lower bottom-cap includes welding features for welding to the multi-chambered container. The bottom-cap further includes one or more auxiliary ports for injecting a reagent when the lid apparatus is in a closed configuration sealingly attached to the multi-chambered sample container.

20 Claims, 11 Drawing Sheets

*Detail A*

Related U.S. Application Data continuation of application No. PCT/US2019/052483, filed on Sep. 23, 2019.

(51) Int. Cl.

| | |
|---|---|
| ***B65D 25/04*** | (2006.01) |
| ***B65D 43/02*** | (2006.01) |
| ***B65D 47/00*** | (2006.01) |
| ***B65D 51/18*** | (2006.01) |

(58) Field of Classification Search

CPC .... B65D 43/0204; B65D 47/00; B65D 47/04; B65D 47/0857; B65D 51/00; B65D 51/18

USPC .......................................... 220/553; 222/129

See application file for complete search history.

(56) References Cited

U.S. PATENT DOCUMENTS

| | | | |
|---|---|---|---|
| 5,219,100 | A | 6/1993 | Beck et al. |
| D339,065 | S | 9/1993 | Forsyth et al. |
| D340,187 | S | 10/1993 | Forsyth |
| 5,441,163 | A | 8/1995 | Carrasco et al. |
| 6,637,628 | B2 | 10/2003 | Hoeser |
| D565,407 | S | 4/2008 | Kick |
| D582,271 | S | 12/2008 | Vogel et al. |
| 7,909,212 | B2 | 3/2011 | Parve et al. |
| 7,913,868 | B2 | 3/2011 | Dolan et al. |
| 8,100,303 | B2 | 1/2012 | Parve et al. |
| 9,394,086 | B2 | 7/2016 | Jordan |
| 11,891,219 | B2 | 2/2024 | Jordan |
| 2003/0044324 | A1 | 3/2003 | Micklash, II et al. |
| 2003/0233083 | A1 | 12/2003 | Houwaert et al. |
| 2006/0169708 | A1 | 8/2006 | Chang et al. |
| 2007/0228079 | A1 | 10/2007 | Vogel et al. |
| 2007/0295762 | A1 | 12/2007 | Zeitlin et al. |
| 2008/0090287 | A1 | 4/2008 | Larsen et al. |
| 2008/0116204 | A1 | 5/2008 | Ohse et al. |
| 2008/0187465 | A1 | 8/2008 | Horacek et al. |
| 2009/0105611 | A1 | 4/2009 | Wilkinson et al. |
| 2009/0173682 | A1 | 7/2009 | Robinson et al. |
| 2010/0230446 | A1 | 9/2010 | Daggett et al. |
| 2010/0233035 | A1 | 9/2010 | Denawa et al. |
| 2011/0170807 | A1 | 7/2011 | Khubani et al. |
| 2011/0212002 | A1 | 9/2011 | Curry et al. |
| 2014/0284338 | A1 | 9/2014 | Jordan |
| 2016/0346970 | A1 | 12/2016 | Oikawa et al. |
| 2017/0036828 | A1 | 2/2017 | Jordan |
| 2019/0134624 | A1 | 5/2019 | Iqqbal et al. |

FOREIGN PATENT DOCUMENTS

| | | | |
|---|---|---|---|
| CN | 105229136 | B | 3/2018 |
| CN | 108485912 | A | 9/2018 |
| DE | 102006001881 | | 7/2007 |
| EP | 1808698 | A1 | 7/2007 |
| EP | 2970848 | A1 | 1/2016 |
| EP | 2970848 | B1 | 10/2018 |
| GB | 9714070 | | 9/1997 |
| IN | 6052CHENP2015 | | 7/2016 |
| JP | 2003500674 | A | 1/2003 |
| JP | 2005501698 | A | 1/2005 |
| JP | 2005526522 | A | 9/2005 |
| JP | 2005526977 | A | 9/2005 |
| JP | 2009523102 | A | 6/2009 |
| JP | 6480410 | B2 | 3/2019 |
| KR | 20140081508 | A | 7/2014 |
| MX | 367967 | | 9/2019 |
| WO | 2000/72970 | A1 | 12/2000 |
| WO | 2004085272 | | 10/2004 |
| WO | 2007/082696 | A1 | 7/2007 |
| WO | 2012033439 | | 3/2012 |
| WO | 2014052671 | A1 | 4/2014 |
| WO | 2014145151 | | 9/2014 |

Detail A

Section C-C

MULTI-CHAMBERED LID APPARATUS WITH REAGENT PORT

CROSS-REFERENCES TO RELATED APPLICATIONS

This application is a Continuation of U.S. application Ser. No. 16/585,660, filed Sep. 27, 2019 (now U.S. Pat. No. 11,345,525), which is a Continuation of PCT Application No. PCT/US19/52483, filed Sep. 23, 2019, each of the above noted references is incorporated by reference herein

BACKGROUND OF THE INVENTION

Multi-chambered containers having hinged lids are used in the sample testing industry. These lids can have a plurality of filling ports, typically one for each chamber of a container. This enables, inter alia, a simultaneous filling of each chamber of the container.

Often, such lids are molded out of a polymer material, and then secured to a container, e.g. by ultrasonic welding. The unique physical properties and user requirements for such multi-chambered lid apparatus has resulted in difficulties, both in the manufacture and use thereof. Often, such lids are suited for use with a particular container and reagent filling system and have limited versatility in use, for example, such lids typically do not allow for the addition of third-party reagents by a user. The instant invention addresses these and other concerns.

BRIEF SUMMARY OF THE INVENTION

Some embodiments of the invention provide an apparatus with a top lid having a major opening, wherein the top lid includes a hinged end and a snap-fit end; and a bottom-cap hingedly attached to the top lid, the bottom-cap comprising an upper side and a lower side. The lower side includes interfacing features for sealingly coupling with a multi-chambered container, while the top side includes a plurality of passages and openings to facilitate automated use of the lid and container, and further includes an auxiliary port to allow addition of a third-party reagent by a user.

The lower side of the bottom-cap may comprise a lower side main surface, an outermost edge extending downward from the lower side main surface. A plurality of outermost edge alignment features may extend downward from the lower side main surface. A continuous outer welding ridge may extend downward from the lower side between the outermost edge and the alignment features. A plurality of walls can define separate cavities for each passage of the plurality of passages. The plurality of walls can extend from a bottom surface of the lid. An inner welding pattern can extend from ends of the walls and from the lower side main surface. The inner welding pattern may be patterned such that each cavity defined by the plurality of walls is surrounded by the inner welding pattern. In an open configuration the top lid is hinged away from the bottom-cap, and in a closed configuration the top lid is engaged with the bottom-cap. In the closed configuration, the snap-fit end of the top lid engages a snap portion of the outermost edge of the lower side of the bottom-cap and a central cylindrical with top opening fits into the major opening of the top lid.

Some embodiments of the invention provide an apparatus having a top lid having a plurality of openings, wherein the top lid includes a hinged end and a snap-fit end. A bottom-cap can be hingedly attached to the top lid. The bottom-cap can comprise an upper side and a lower side. The upper side can comprise a plurality of chimneys upwardly extending from a lower surface of the upper side. Each chimney can include a passage that extends to an opening at the top of the chimney, wherein each chimney mates with a corresponding opening of the top lid. The bottom-cap further includes at least one auxiliary port having an opening that is larger than the openings atop each of the chimneys and is disposed in a location corresponding to an opening of the top lid. The auxiliary port allows a user to inject a third-party reagent when the lid apparatus is in the closed configuration and sealingly attached to the multi-chambered sample cartridge. In some embodiments, the auxiliary port is an opening disposed on the upper side and about flush with the top surface of the upper side of the bottom-cap. In some embodiments, the port is a non-circular shape (e.g. square, pie-shape, triangular). In some embodiments, the port opening is larger than the corresponding opening in the top lid.

The lower side of the bottom-cap can comprise a lower side main surface. An outermost edge can extend downward from the lower side main surface. A plurality of outermost edge alignment features can extend downward from the lower side main surface. The alignment features can be in close vicinity to the outermost edge. A continuous outer welding ridge can extend downward from the lower side between the outermost edge and the alignment features. An inner welding pattern can extend from ends of the walls and from the lower side main surface, such that the inner welding pattern is not coextensive with any walls that extend from the lower side main surface. In an open configuration the top lid is hinged away from the bottom-cap, and in a closed configuration the top lid is engaged with the bottom-cap. In the closed configuration the snap-fit end of the top lid engages a snap portion of the outermost edge of the lower side of the bottom-cap.

In some embodiments, a multi-chambered container can be connected to the bottom-cap, wherein corresponding edges of the multi-chambered container are welded to the outermost welding ridge and inner welding pattern such that each chamber of the multi-chambered container is fluidically sealed from one another at the connection between the multi-chambered container and the bottom-cap.

In some embodiments, the major opening of the top lid comprises a circular opening. The circular opening can be defined with a raised portion or can itself be a raised cylindrical feature extending from the bottom-cap.

In some embodiments, the top lid comprises a first lateral side and a second lateral side extending between the hinged end and the snap-fit end. In some embodiments, the snap-fit portion extends along a majority of the front end of the lid apparatus. In some embodiments, the snap-fit end comprises a straight snap portion displaced off of a curved portion.

In some embodiments, the hinged end of the top lid comprises a first hinge and a second hinge, each being medially displaced from the first and second lateral sides. In some embodiments, the hinged end of the top lid comprises only a single hinge.

In some embodiments, the top lid comprises a cylindrical wall extending downward from the upper-most top lid surface, the cylindrical wall defining the major opening. In some embodiments, the top lid comprises a bottom top lid surface opposite to the upper-most top lid surface, the cylindrical wall extending past the bottom top lid surface. In some embodiments, the top lid includes a plurality of cylindrical walls extending from the bottom top lid surface.

In some embodiments, the plurality of outermost edge alignment features on the lower side of the bottom-cap comprise curved walls extending away from the outermost edge.

In some embodiments, the plurality of walls on the lower side of the bottom cap defining separate cavities form a central cylindrical cavity and a plurality of petal shaped cavities extending from the central cylindrical cavity. In some embodiments, the plurality of walls defining separate cavities further form a plurality of wedge shaped cavities. In some embodiments, the plurality of walls defining separate cavities share a uniform wall thickness.

In some embodiments, the inner welding pattern (i.e., ridge or energy director) comprises a triangular cross-section. In some embodiments, the continuous outer welding pattern (i.e., ridge or energy director) comprises a triangular cross-section.

Another aspect of the invention comprises a method for carrying out a reaction or an assay in a fluid container as disclosed herein. In some embodiments, the method comprises lysis of a cell or microorganism. In some embodiments, the method comprises preparation of a sample within a fluid cartridge to isolate or purify an analyte of interest. In some embodiments, the method comprises detecting an analyte of interest. In some embodiments, the analyte of interest is selected from the group consisting of cells, proteins, and nucleic acids. In some embodiments, the method comprises the use of an enzyme or a binding moiety. Another aspect of the invention comprises a method for filling a fluid container with liquid reagents, wherein the fluid container is mated with a lid as disclosed herein. In some embodiments, the method involves filling one or more chambers of the fluid cartridge with a reagent.

It is appreciated the auxiliary port feature described herein can be incorporated into any of the lid apparatus described herein or described in any applications incorporated herein by reference.

DETAILED DESCRIPTION OF THE INVENTION

Figure 1A:
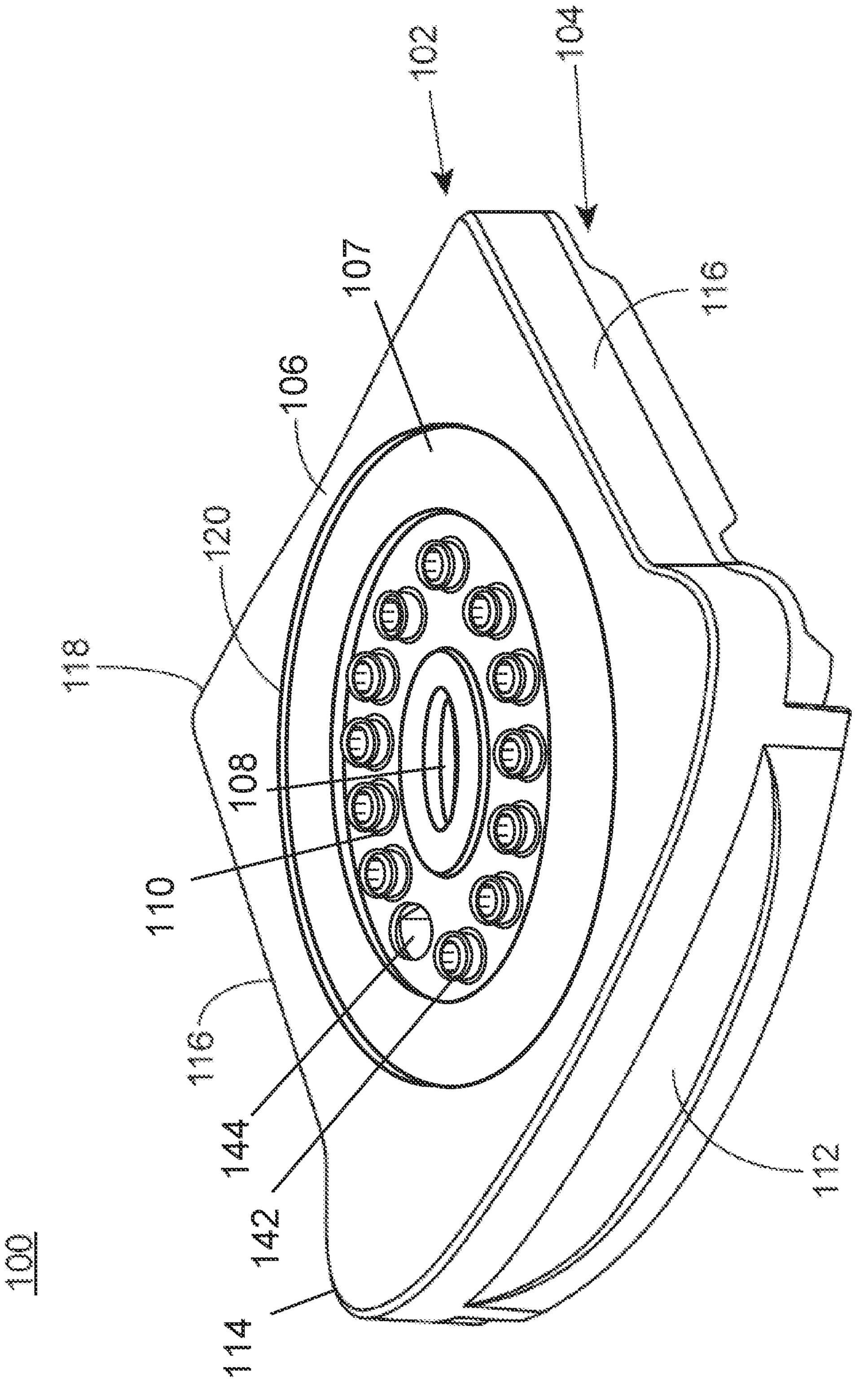
FIG. 1A shows a perspective view of a lid apparatus, according to some embodiments.

FIG. 1A shows a perspective view of a lid apparatus 100. The apparatus 100 includes a top lid 102 connected to a bottom-cap 104 by a hinge (not shown in this view). The top lid 102 has an upper surface 106 that defines a major opening 108, which is shown as being circular. The major opening 108 is disposed in a center of a circular portion that further includes a plurality of openings 110 surrounding the major opening, which are also shown as being circular in shape. The upper surface 106 also may define other contours, openings, passages, and holes.

The top lid 102 includes a snap end 112 having features defining an overhanging feature that "snaps" over a portion of the bottom-cap 104. The snap-fit end 112 features a curvilinear profile leading to bulbous ends 114, which in turn lead to non-parallel sides 116. The non-parallel sides connect to a hinged-end 118, which has a straight profile. A central portion 107 having a generally circular shape surrounds a smaller circular portion in which the plurality of openings are defined. In some embodiments, the central portion 107 is slightly recessed and the smaller circular portion is further recessed relative the upper surface 106 when the top-lid 102 is closed.

Figure 1B:
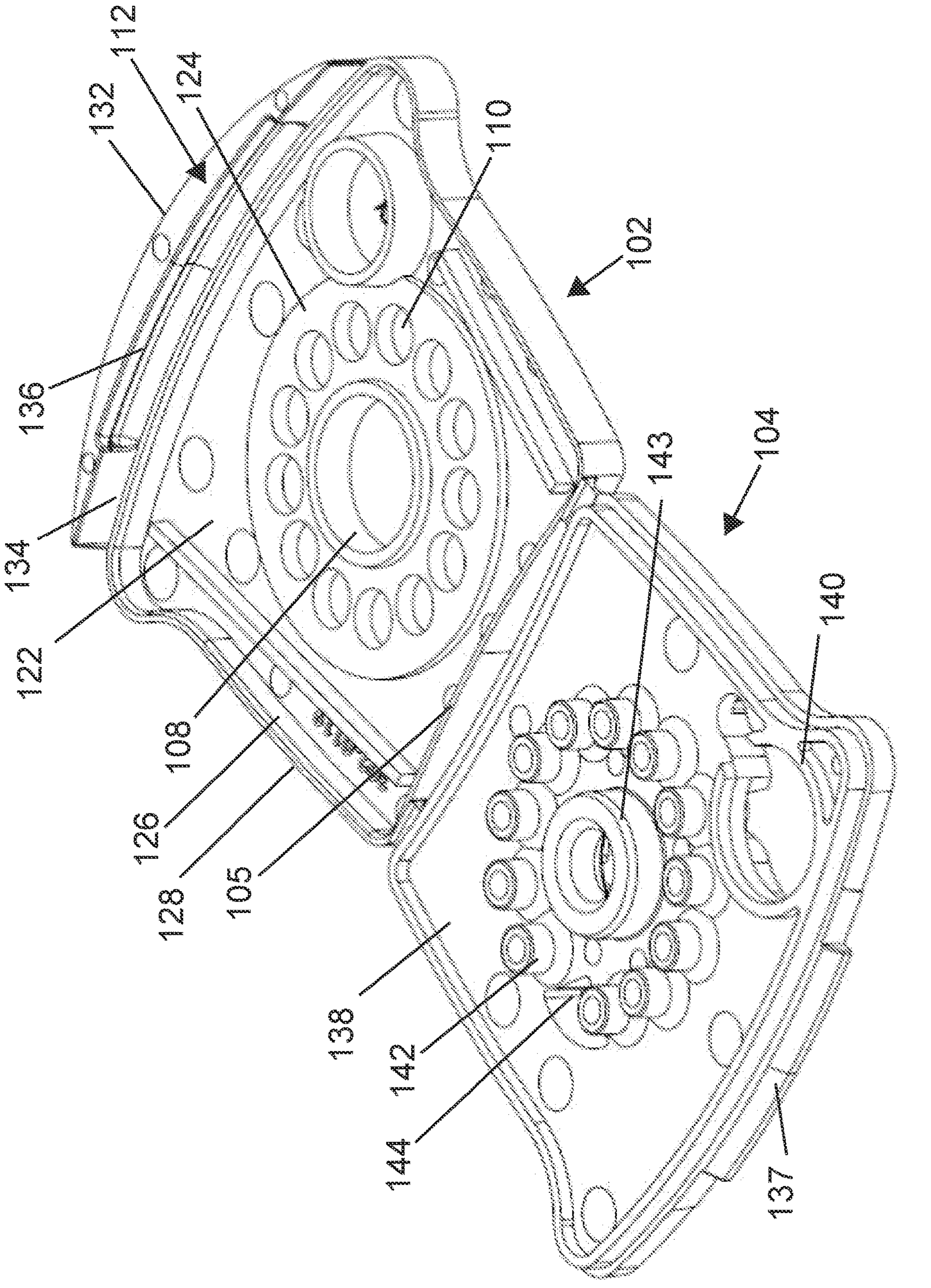
FIG. 1B shows a perspective view of a top side of the lid apparatus of FIG. 1A positioned according to an open configuration.

FIG. 1B shows the top-lid 102 and bottom-cap 104 spread apart in an open configuration, in which the top-lid 102 is hinged away from the bottom-cap 104 via hinges 105. A bottom-facing surface 122 of the top lid 102 is shown, from which a major cylindrical wall 124 of the major opening 108 extends. An inner wall surface 126 extends from and bounds a periphery of the bottom-facing surface 122. A bottom edge surface 128 sits atop the inner wall surface.

The snap-fit end 112 extends downwardly with (and past) the inner-wall surface 126 from the bottom-facing surface 122. An outer-curved wall 132 and an inner-curved wall 134 define the crescent-like shape of the snap-fit end. A cavity is cored out between the outer-curved wall 132 and the inner-curved wall 134 to help maintain a constant wall thickness throughout. The curvature of the inner-curved wall 134 is interrupted by a centrally located flex-tab 136. The flex-tab 136 has a straight edge for interfacing with a corresponding straight portion 137 of the bottom-cap 104. In this embodiment, the flex-tab 136 of the snap-fit end 112 extends across a majority of the inside front end of the top lid. Prior devices utilizing a curved tab edge have been found to be unsatisfactory in providing a sufficient snap-fit.

The lower surface 138 can include one or more openings, such as filling hole 140, which can be shaped like a key-hole. The passages are arranged in an orbital pattern about a central passage 143; however the openings can be defined in other arrangements as desired.

A plurality of chimneys 402 (with passages) that protrude into openings 110 in the top lid when closed. Each chimney includes a passage and a top opening. The plurality of chimneys 402 surround a central raised circular opening 143 that has a raised lip or cylindrical features that protrudes into the major opening 108 of the top lid when closed. The bottom-cap 104 further includes one or more auxiliary ports 144 having an opening larger than the top openings of the plurality of chimneys. In another aspect, the auxiliary port is larger than the corresponding hole in the top lid, whereas the openings in the chimneys are smaller than the corresponding holes in the top lid. In this embodiment, the bottom-cap includes a single auxiliary port, although it is appreciated that additional auxiliary ports could be included. In this embodiment, the auxiliary port 144 is non-circular (e.g. pie-shape) in shape and is about flush with the top surface 138 of the bottom cap such that when the top lid is closed, no portion of the auxiliary port protrudes into the respective opening 110 disposed directly over the auxiliary port 144. This allows additional clearance to allow a user to inject, such as with a needle or pipette, a third-party reagent via the auxiliary port. In some embodiment, the at least one auxiliary opening is configured to allow insertion of a needle or pipette of 0.14" or less.

Figure 1C:
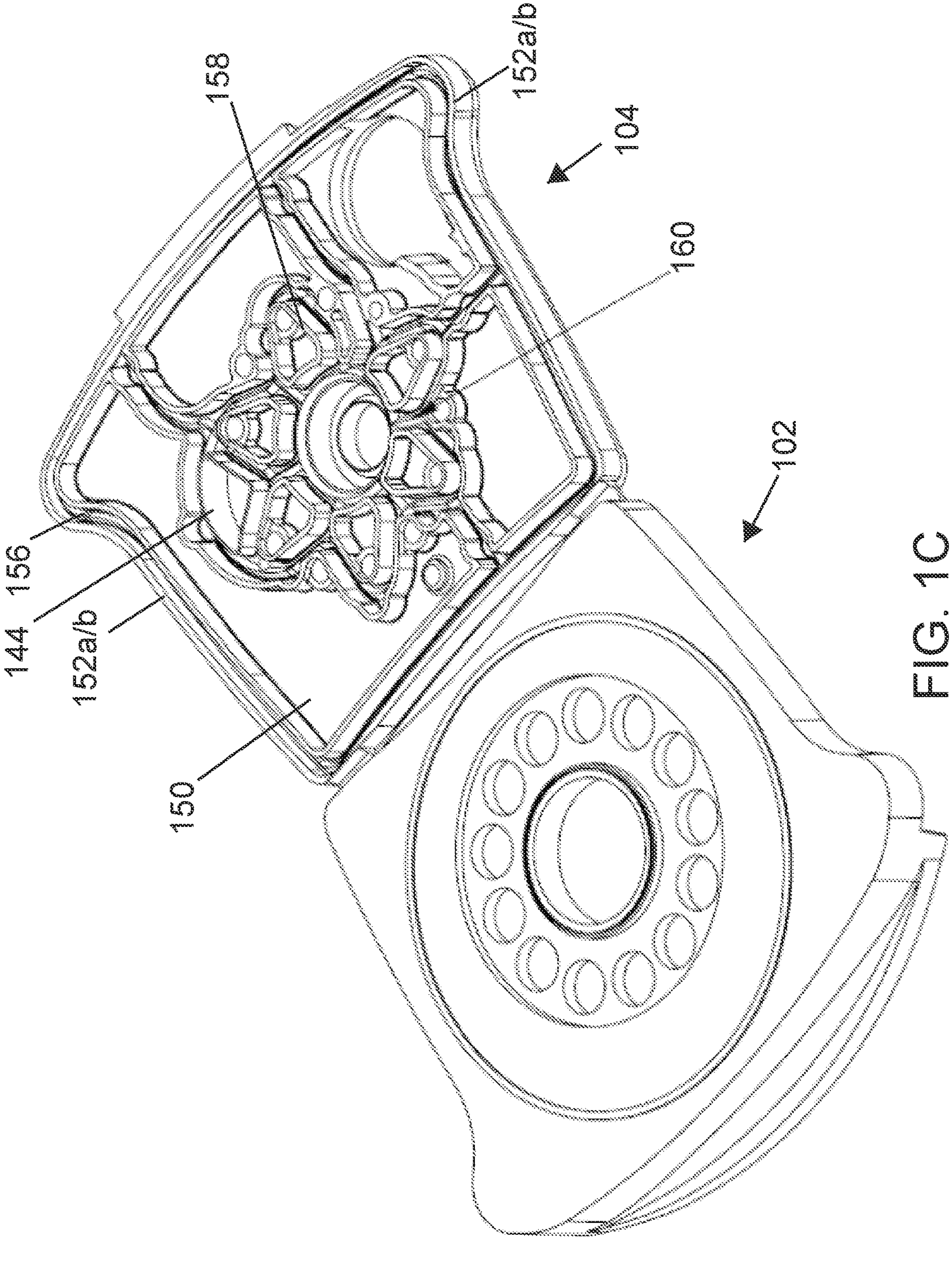
FIG. 1C shows a perspective view of the bottom side of the lid apparatus of FIG. 1A in the open configuration.

FIG. 1C shows a bottom view of the lower-side of bottom-cap 104, which includes a lower-side main surface 150. An outer-most edge 152*a* extends downward from the lower-side main surface 150 to form an outer-wall 152*b*. The outer-wall 152*b* is nearly continuous about the periphery of the bottom-cap 104, with an interruption occurring adjacent to the hinge.

In some embodiments, edge alignment features are placed along each side of the lower-side main surface 150 and in close proximity to the outer wall 152*b*. The edge alignment features provide buttresses for aligning walls of a multi-chambered fluid container with the bottom-cap 104. One or both of the wall 152*a/b* or any Portion Thereof can Act as the Edge alignment feature. A typical fluid container suitable for use with the cap can be seen in FIG. 3. Alignment walls extend from, and in some cases in-between, the edge alignment features provide further engagement points against walls of a fluid container.

A raised welding ridge 156 is continuous about the periphery of the bottom-cap 104, between the edge alignment features and the outer wall 152*b*. When seated in a proper fashion, the edge alignment features and alignment walls prevent excessive rotation of the bottom-cap 104 against the fluid container, thus aligning the raised welding ridge 156 of the bottom-cap 104 with weldable features (e.g., edges of walls) of the bottom container.

A plurality of walls 158 extend from a central portion of the lower-side main surface 150. The walls are patterned in a flower petal-like arrangement, about a central cylinder. Here, the walls 158 are formed as six petals. A raised welding pattern 160 is present on the top edges of the walls 158. Raised ridges 159 between the petals act as energy directors to isolate the chambers formed by the walls 158. The raised welding pattern 160 connects to the welding ridge 156. In this manner, four fluidic zones are created outside the petals. When a fluid container and the bottom-cap 104 are welded via the raised welding pattern 160 and welding ridge 156, sub-containers within the bottom container are fluidly isolated from one another (at least at the interface between the fluid container and the bottom-cap 104).

Figure 1D:
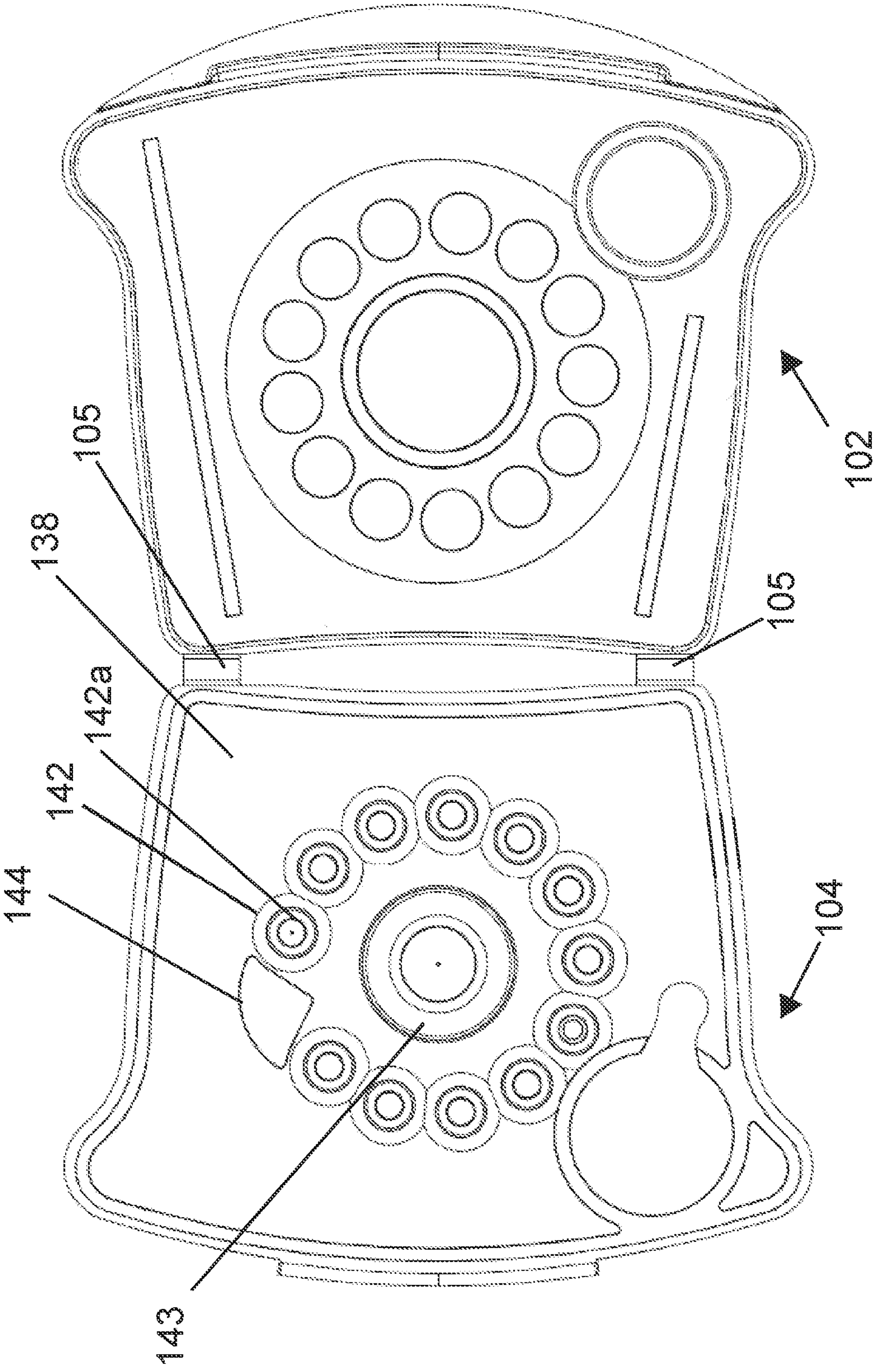
FIG. 1D shows a close-up top view of the lid apparatus of FIG. 1A in the open configuration.

FIG. 1D shows a top view of the lid apparatus in the open configuration with the pin locations for injection molding noted by hashed circles (see arrow). As can be seen, the openings 142*a* in chimneys 142 are considerably smaller than the opening in the auxiliary port 144. Further, the auxiliary port 144 is non-circular and is without a chimney such that the auxiliary port 144 can occupy the available space to provide additional clearance.

Figures 1E, 1F:
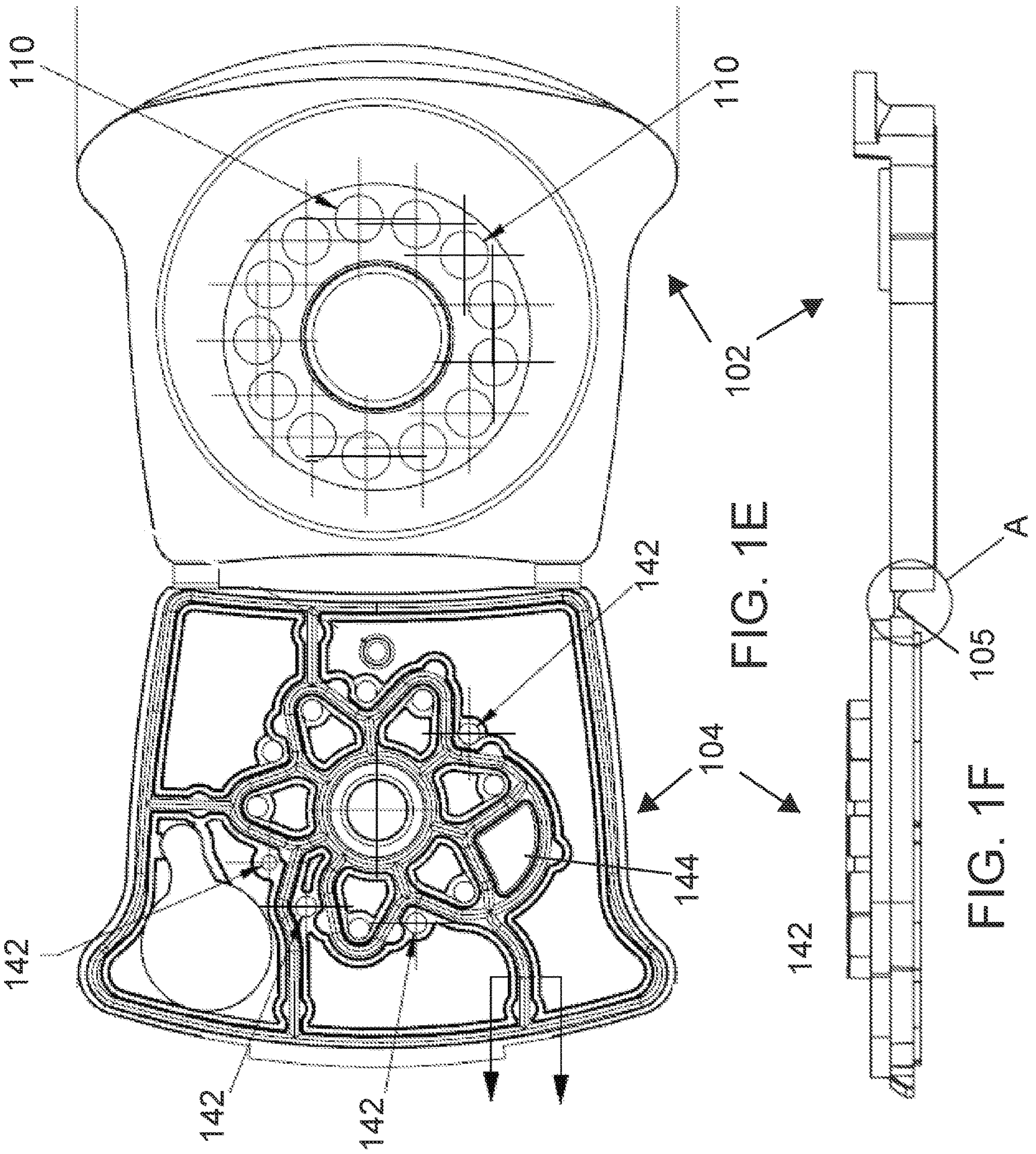
FIG. 1E shows a close-up bottom view of the lid apparatus of FIG. 1A in the open configuration.
FIG. 1F shows a close-up side view of the lid apparatus of FIG. 1A in the open configuration.

In some embodiments, the opening of the auxiliary port 144 can have an area that is larger than the opening in each respective chimney by about 20%, 30%, 40%, 50%, 60%, 70%, 80%, 90%, 100%, 125%, or 150% or greater. By providing an auxiliary port that is substantially larger than the chimney openings allows a user to more easily inject, such as by a needle or pipette, a third-party reagent through the port when the lid is closed. Because the auxiliary port 144 is non-circular and does not protrude into the corresponding opening in the lid, this allows even more clearance such that the needle or pipette can be inserted or angled through the opening for injection of the reagent and can be readily removed after. In contrast, inserting needles or pipettes into a circular opening can create a friction-fit such that the needle or pipette becomes stuck when injecting reagent into a port. Such a friction-fit can also lead to a build-up of pressure, thereby frustrating pressurized injection of fluid. The particular shape of a triangle, wedge or pie-shape, as shown in the depicted embodiment, is advantageous as it allows for an enlarged, non-circular opening, yet still fits between adjacent chimneys and within the defined petal shaped chamber, as shown in the bottom view shown in FIG. 1E.

Figure 2A:
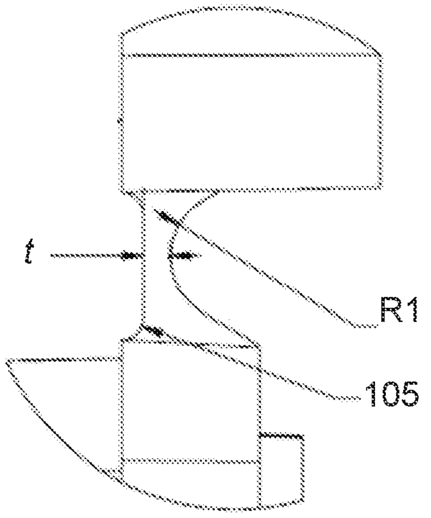
FIGS. 2A-2D show detailed close-up views of various features of the lid apparatus of FIG. 1A.
Figure 2C:
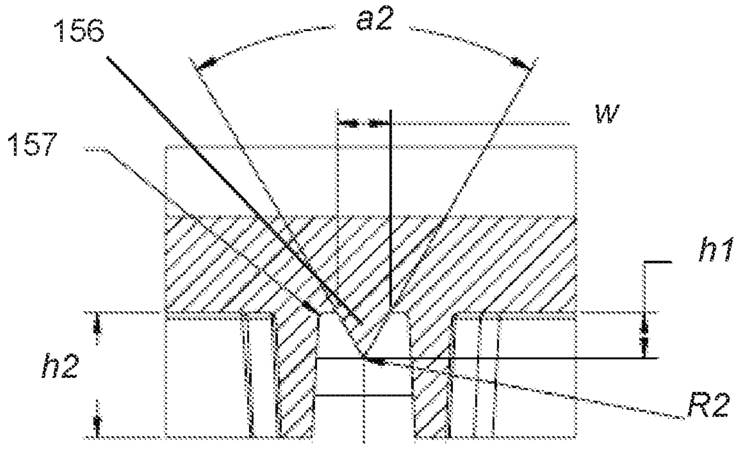
Figure 2B:
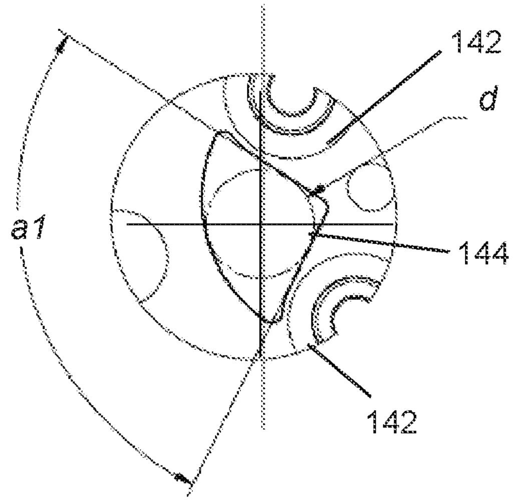

FIG. 2A-2D shows close-up detail views of various features of the lid assembly in FIG. 1A. FIG. 2A shows a detail view of the hinge 105. Hinge 105 includes a thinned portion having a thickness t and an inside curved radius. The thickness is sufficiently thin to allow flexure between joined components, for example, a thickness t within a range of 0.01-0.05", 0.01-0.03", or 0.01-0.02", for example 0.015"+/−0.001". The inner radius R1 can be within a range between 0.01-0.05", 0.01-0.04", for example about 0.03"+/−0.01". It is appreciated that various other types of hinge designs can also be used. FIG. 2B illustrates a detail view of the auxiliary port 144 disposed between adjacent chimneys 142. In some embodiments, the curved portion of the wedge extends along an arc of angle a1 of any of the following ranges: 75-120 degrees, 80-110 degrees, and 90-110 degrees, for example, about 97 degrees+/−5. In some embodiments, the wedge is dimensioned to accommodate an opening of at least a diameter d within a range of 0.1-0.5", 0.1-0.3", or 0.1-0.2", for example, a diameter of about 0.139"+/−0.05". FIG. 2C shows a cross-section C-C illustrating the construction and dimensions of the welding ridge 156 disposed within a channel 157 dimensioned to receive a corresponding raised edge of the sample container to facilitate sealing when the ridge is welded to the raised edge of the sample container. In this embodiment, the radius R2 of the apex of the ridge is about 0.005" or less, for example, 0.002" or less, and the slope of the sidewalls of the ridge is determined by arc a2, which can be within a range between 40-110 degrees, 50-90 degrees, or 50-80 degrees, for example about 60 degrees+/−10. The height h1 of the ridge 156 can be about 0.05" or less, for example about 0.022"+/−0.01", while the height of the sidewalls of the channel 157 has a height h2, which is greater than height h1 of the ridge, for example h2 can be 0.02" or greater, 0.03" or greater, 0.04" or greater, 0.05" or greater or greater, for example, about 0.05"+/−0.02". The overall width of the ridge 156 within the channel is w, which can be within a range of 0.01-0.05", or 0.02-0.04", for example about 0.025"+/−0.01". It is appreciated that while certain dimensions are shown for the above-noted features, these concepts are not so limited as these features can be of any suitable dimension desired for a particular lid configuration. For example, the above dimensions can be determined relative each other and scaled appropriately based on the scale of the lid.

Figure 2D:
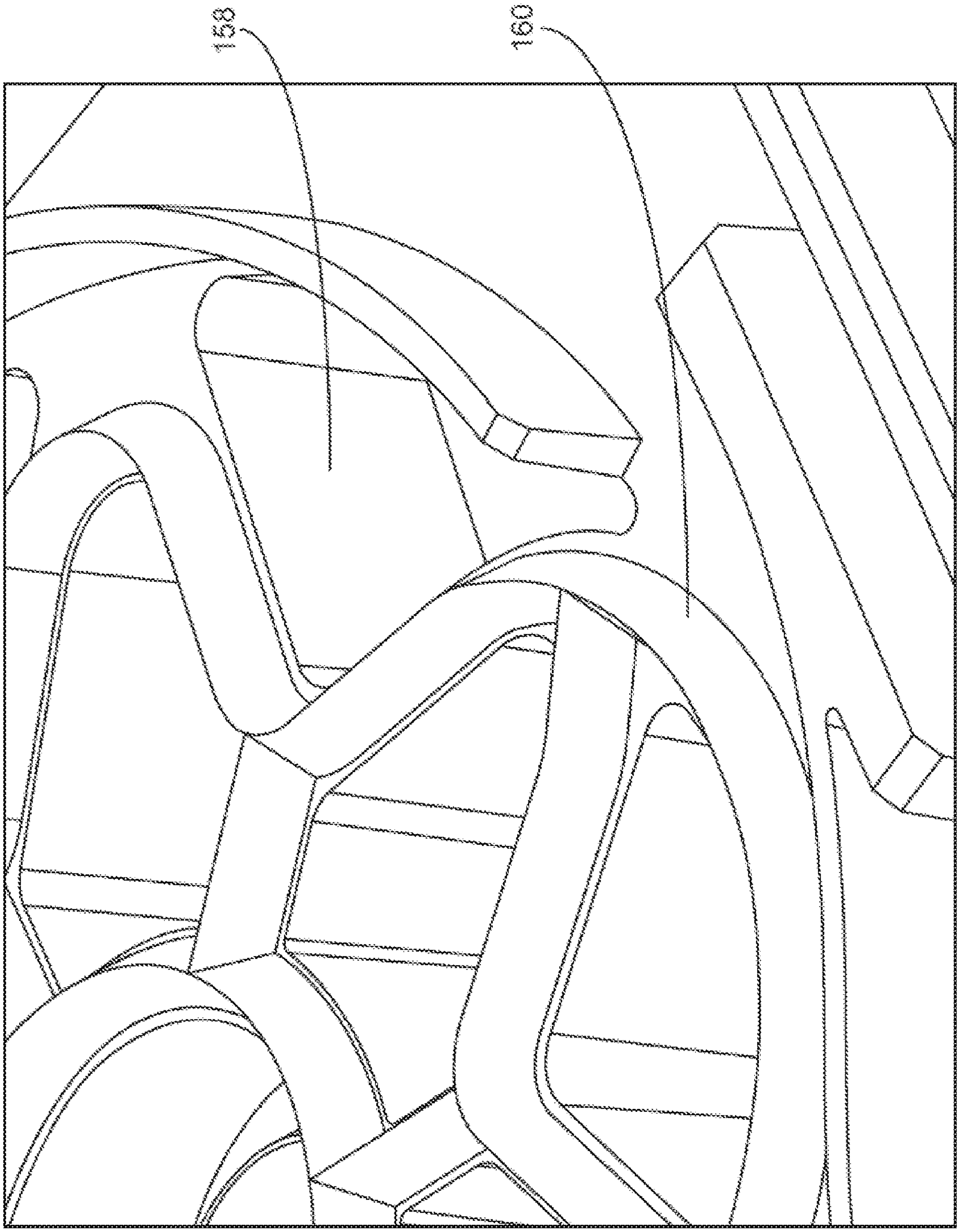

FIG. 2D shows a close-up view of the raised welding pattern 160, which has a triangular cross-section. This shape acts as a "energy director" when ultrasonic energy is applied to the apparatus 100 in order to weld the raised welding pattern 160 (and likewise the raised welding ridge 156, which is shaped in the same manner) to a container. The apparatus 100 features uniform wall thickness throughout, except for the raised welding pattern 160 and raised welding ridge 156, which are both triangular. Thus, energy is preferentially directed to the tips of the triangles, which are in contact with edges of the container, resulting in the fusion of the triangular raised welding pattern 160 and raised welding ridge 156 to walls of the container.

Figure 3:
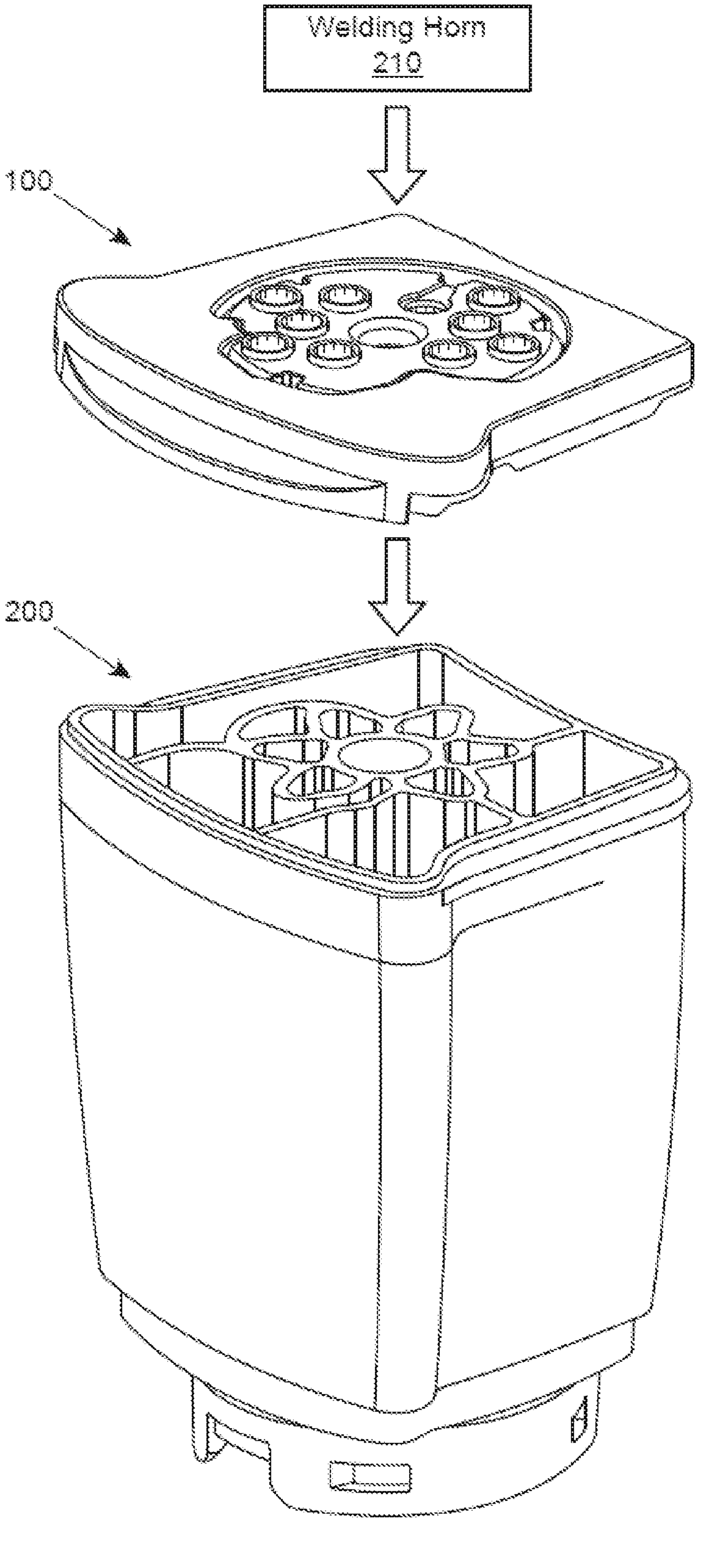
FIG. 3 shows a lid apparatus assembling process, according to some embodiments.

FIG. 3 shows the lid apparatus 100 in relation to a fluid container 200. The container 200 contains a plurality of chambers that can be fluidly coupled or non-coupled according to the position of an internal valve assembly. The chambers are defined by walls that extend to the top of the container 200. The fused interface between the lid apparatus 100 and the fluid container 200 is created such that the chambers are sealed off from one another by way of a welded interface between the raised welding pattern 160 and welding ridge 156 and the chambers of the container 200.

The lid apparatus 100 can be welded to the fluid container by way of an ultrasonic welding horn that interfaces with the lid while the apparatus is seated on the container 200. The welding horn 210 generally comprises a metal cylinder shaped to interface against and around the lid. The welding horn 210 is part of a greater welding apparatus (not shown) which provides energy to the welding horn 210. A commercially available ultrasonic welding apparatus is available from manufactures such as Hermann Ultrasonics, Bartlett, IL 60103 or Branson Ultrasonics, a division of Emerson Industrial Automation, Eden Prarie, MN 55344, can be used in this process. In some embodiments, the lid apparatus is secured to the fluid container using gaskets or adhesives well known to persons of skill in the art.

The lid apparatus 100 and container can be constructed out of any suitable material, including but not limited to metals, ceramics, and/or plastics. Suitable plastics can include thermal plastics, such as polypropylene, which is a suitable material for handling biological specimens, but not possess optimal welding characteristics. The lid apparatus 100 overcomes this by having nearly uniform wall thickness throughout the bottom-cap 104, which enables the apparatus 100 to be welded to the container using relatively low power of 150 J, versus prior designs which required 350-500 J. Tests have shown that a good weld penetration depth (13-29 thousandths) occurs despite the lower power setting. Other suitable polymers that can be used include but are not limited to polyester, polyethylene, polyimide, ABS, polycarbonate, and the like.

In some embodiments, to weld the lid apparatus 100 to the fluid container 200, the bottom-cap 104 is first brought into contact with the fluid container 200. The outer bottom-side wall and/or the edge alignment features and alignment walls prevent excessive rotation of the bottom-cap 104 against the fluid container 200, thus aligning the raised welding pattern 160 and raised welding ridge 156 of the bottom-cap 104 with edges of the fluid container 200. After the lid apparatus 100 is properly seated, the welding horn 210 is lowered until it contacts the lid. 150 J of energy is then applied to the welding horn for a sufficient time, resulting in a welded lid assembly.

The triangular shapes of the raised welding pattern 160 and welding ridge 156 cause energy to be preferentially directed from upper surfaces about the lid to the raised welding pattern 160 and welding ridge 156, and thereby fuse the raised welding pattern 160 and welding ridge 156 with the fluid container 200. The resulting weld is fluid-tight, such the chambers of the fluid container 200 are fluidically sealed from one another at the connection between the fluid container 200 and the bottom-cap 104 (under pressurized conditions).

The chambers of the fluid container apparatus disclosed herein can contain one or more reagents for a variety of purposes. Further, a user may inject one or more reagents into one or more chambers of the sample container via the one or more auxiliary ports of the lid. These reagents maybe present in a variety of forms. Non-limiting exemplary reagent forms can include a solution, a dry powder, or a lyophilized bead. The reagents may be intended for different purposes including but not limited to chemical and/or enzymatic reactions, sample preparation, and/or detection. Non-limiting exemplary purposes can include lysis of cells or microorganisms, purification or isolation of an analyte of interest (e.g., a specific cell population, a nucleic acid or a protein), digestion or modification of nucleic acids or proteins, amplification of nucleic acids, and/or detection of an analyte of interest.

In some embodiments, the reagent present in a chamber of the apparatus may be a lysis agent (such as a detergent) that can cause the disintegration of cellular membrane, thereby releasing the cellular nucleic acids and proteins for further processing. Lysis agents are formulated differently for effectively lysing specific organisms such as eukaryotic cells, prokaryotic cells, plant cells, viruses, spores, etc.

The reagent in some embodiments may be an antibody, nucleic acid, or other moiety that specifically binds a predetermined molecule (e.g., a cell surface antigen, a specific protein, or a particular nucleic acid sequence that is the intended detection target) and is used for the purpose of separating, purifying, or detecting the pertinent molecule or cells bearing the molecule. Optionally the reagent with desired binding affinity is immobilized on a solid substrate within the chamber. While an antibody or other reagent moiety may be stably stored in a solution under certain conditions, often it is lyophilized or freeze-dried for better stability.

In some embodiments, the reagent may be an enzyme that is capable of digesting a target molecule (e.g., a protein or nucleic acid), such that further analysis can be conducted. Many known proteases and nucleases are commercially available and can be chosen for use in the apparatus of this invention. In other cases, the reagent is an enzyme for a nucleic acid amplification reaction, such as a DNA polymerase for a polymerase chain reaction (PCR), or a reverse transcriptase for a reverse transcription polymerase chain reaction (RT-PCR). Like an antibody, an enzyme may be maintained in a solution but is often kept in lyophilized or dried form in the apparatus of this invention for stability reasons. Typically along with the enzyme, other necessary components of the enzymatic reaction such as ingredients of the reaction buffer, free deoxyribonucleotides, primers, are also present in the same or a different chamber, so that the desired reaction can be constituted quickly when needed.

In some embodiments, the reagent contains necessary ingredients for a chemical reaction, for example, one that is capable of generating a detectable signal (e.g., optical signal) for the detection of a particular target analyte. Aside from the components of an appropriate reaction buffer, at least one agent that is responsible for producing the detectable signal is typically included.

Figure 4B:
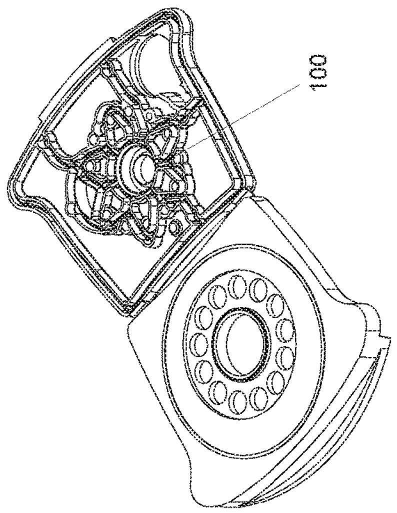
FIGS. 4A-4G show various views of a lid apparatus, according to some embodiments.
Figure 4C:
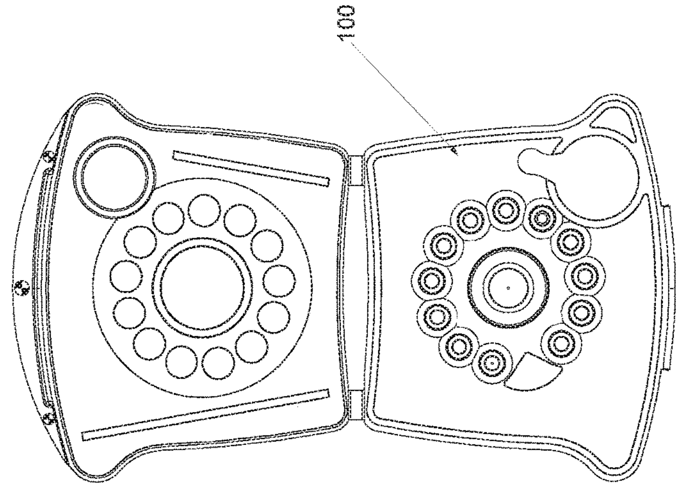
Figure 4A:
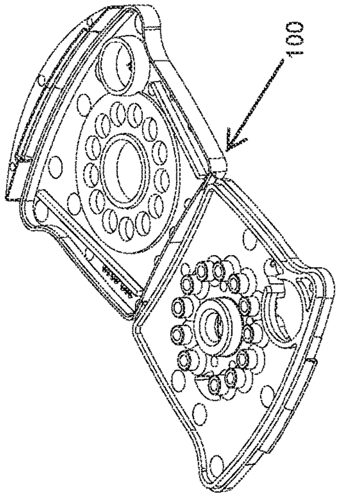
Figure 4F:
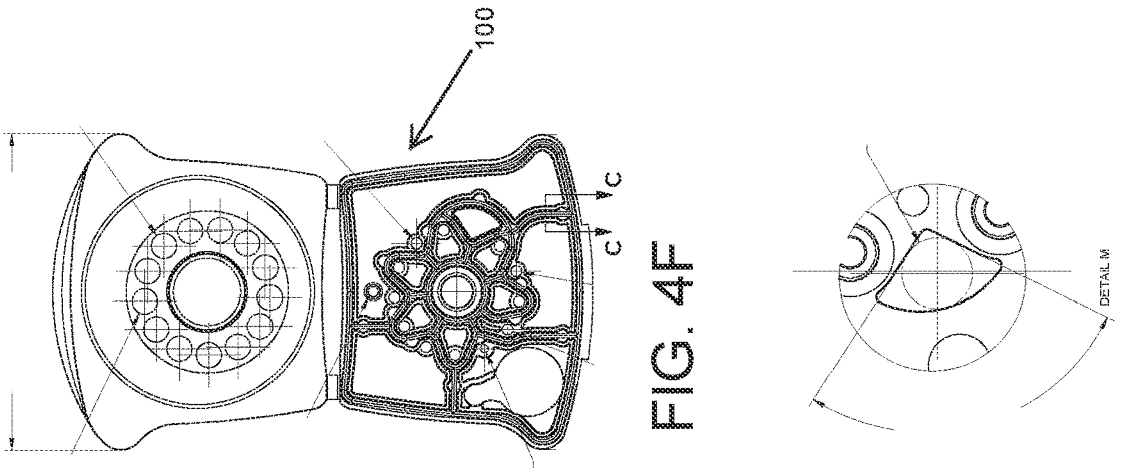
Figure 4E:
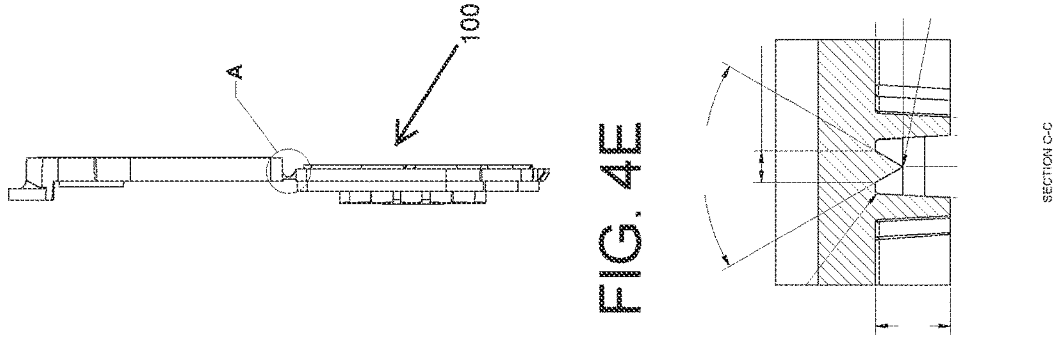
Figure 4D:
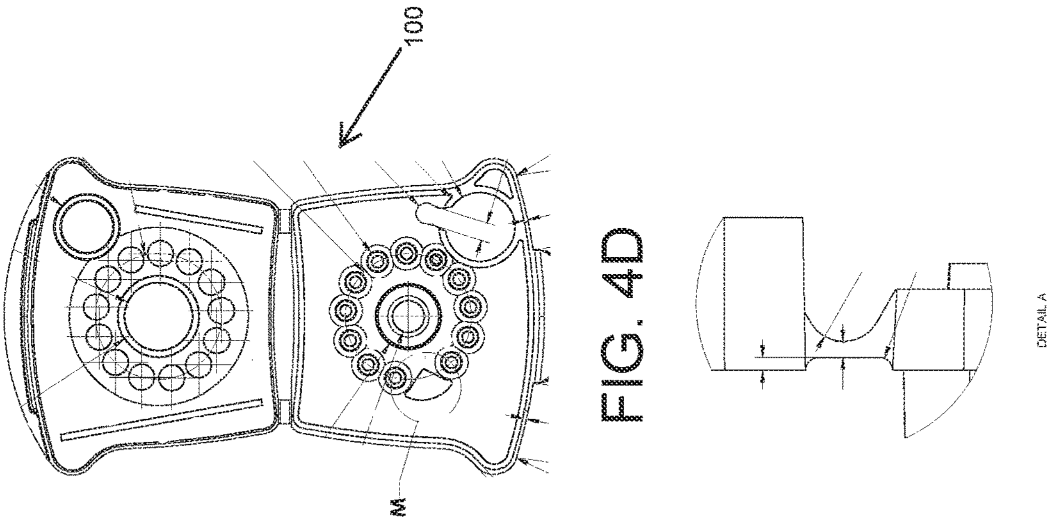
Figure 4G:
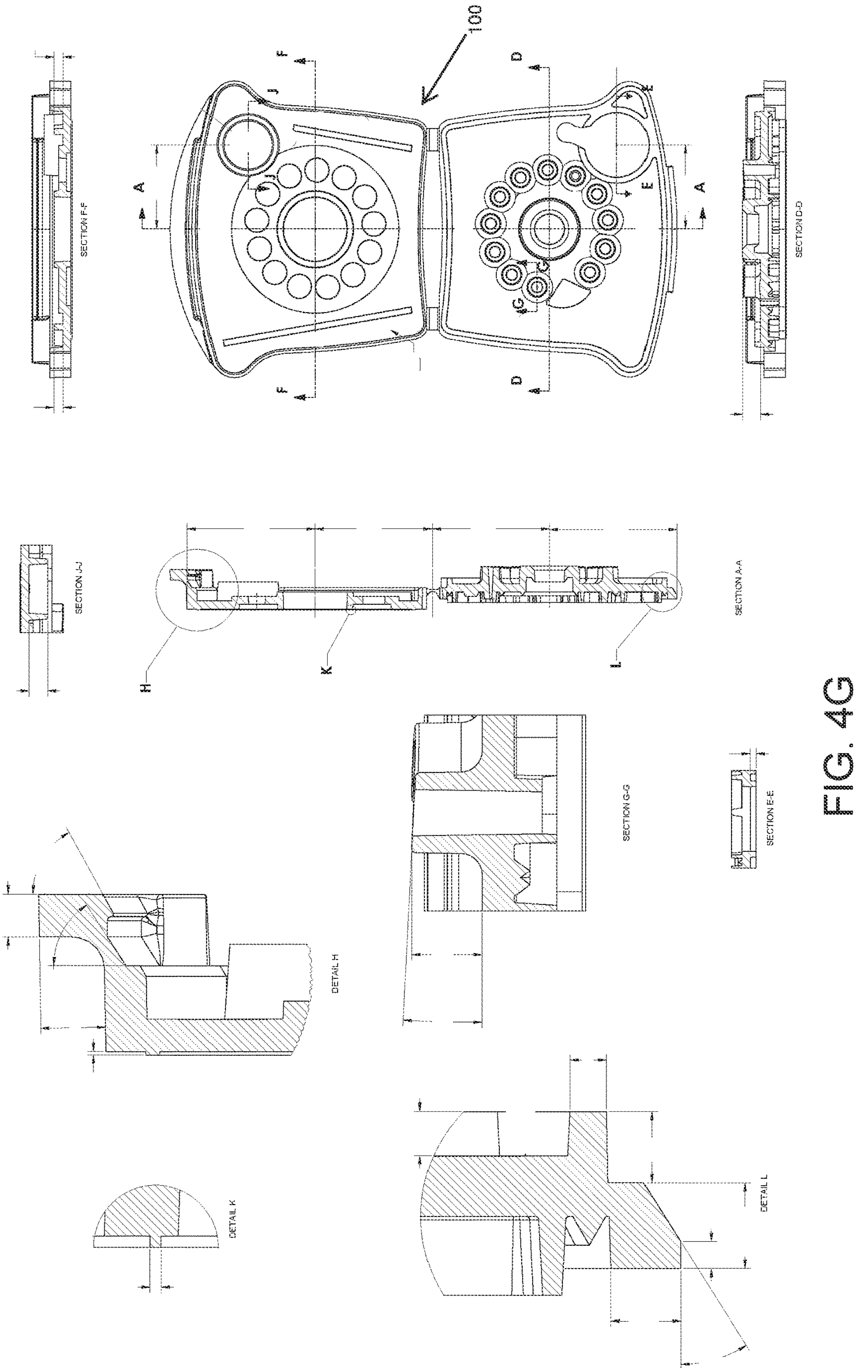

FIGS. 4A-4G depict various view of a lid apparatus 100 and associated detail views, in accordance with some embodiments. FIG. 4A shows a top perspective view of the lid apparatus in the open configuration, and FIG. 5B shows a bottom perspective view of the lid in the open configuration. FIG. 4C shows a top side view of the lid in the open configuration. FIG. 4D shows another top view of the lid in the open configuration with detail M and corresponding detail view. FIG. 4E shows a side view of the lid in the open configuration with detail A and corresponding detail view. FIG. 4F shows an underside view of the lid in the open configuration with detail C and corresponding detail view. FIG. 4G shows a top side view of the lid in the open configuration and details A, D, E, F, G, H, J, K and corresponding detail views. It is appreciated that a lid assembly can include any of these particular details in isolation, or in any combination and that any of the features can be replaced with features having similar functionality, in accordance with the concepts of the invention described herein.

Although the above description shows many specificities and depicts particular details, these should not be construed as limitations on the scope of the invention, but merely as illustrations of some exemplary embodiments. Many possible variations and modifications to the invention will be apparent to one skilled in the art upon consideration of this disclosure.

What is claimed is:

1. An apparatus comprising:
- a top lid having a major opening, wherein the top lid includes a hinged end and a snap-fit end; and
- a bottom-cap hingedly attached to the top lid so as to move between an open configuration and closed configuration, the bottom-cap comprising an upper side and a lower side, wherein the upper side comprises:
  - a plurality of chimneys upwardly extending from a lower surface of the upper side, wherein each chimney includes a passage extending to a top opening and each chimney mates with a corresponding opening of the top lid, and
  - at least one auxiliary port having an opening larger than each top opening of the plurality of chimneys to facilitate fluid-injection of a reagent therethrough when the top lid and bottom-cap are in the closed configuration;
- wherein the lower side of the bottom-cap comprises:
  - a lower side main surface;
  - an outermost edge extending downward from the lower side main surface; and
  - a plurality of walls defining separate cavities for each opening of the plurality of chimneys and the at least one auxiliary port.

2. The apparatus of claim 1, wherein each of the plurality of chimneys protrudes through a corresponding opening of the top lid when closed, and the at least one auxiliary port is defined within the lower surface of the upper-side of the bottom-cap such that no part of the auxiliary port protrudes into the corresponding opening of the top lid when in the closed configuration.

3. The apparatus of claim 1, wherein the at least one auxiliary port is about flush with the lower surface of the upper side of the bottom-cap.

4. The apparatus of claim 1, wherein the at least one auxiliary port is non-circular.

5. The apparatus of claim 4, wherein the at least one auxiliary port has a triangle, wedge, or pie-shape.

6. The apparatus of claim 1, wherein the at least one auxiliary port is configured to allow insertion of a needle or pipette of 0.14" or less.

7. The apparatus of claim 1, where the bottom-cap further comprises one or more additional auxiliary ports configured to allow injection of one or more additional reagents therethrough.

8. The apparatus of claim 1, wherein the lower side of the bottom-cap includes a wall extending therefrom and surrounding the auxiliary port, the wall being of the same shape as the auxiliary port.

9. The apparatus of claim 1, further comprising a continuous outer welding ridge extending downward from the lower side between the outermost edge and one or more alignment features, and an inner welding pattern extending from ends of the walls and from the lower side main surface, the inner welding pattern being patterned such that each cavity defined by the plurality of walls is surrounded by the inner welding pattern.

10. The apparatus of claim 1, wherein in an open configuration the top lid is hinged away from the bottom-cap, and wherein in a closed configuration the top lid is engaged with the bottom-cap, wherein in the closed configuration the snap-fit end of the top lid engages a snap portion of the outermost edge of the lower side of the bottom-cap.

11. The apparatus of claim 9, further comprising a multi-chambered container connected to the bottom-cap, wherein corresponding edges of the multi-chambered container are welded to the outermost welding ridge and inner welding pattern such that the chambers of the multi-chambered container are fluidically sealed from one another at the connection between the multi-chambered container and the bottom-cap.

12. The apparatus of claim 1, wherein the major opening of the top lid comprises a circular opening.

13. The apparatus of claim 1, wherein the top lid comprises a first lateral side and a second lateral side extending between the hinged end and the snap-fit end.

14. The apparatus of claim 1, wherein the hinged end of the top lid comprises a first hinge and a second hinge, each being laterally displaced from the first and second lateral sides.

15. The apparatus of claim 1, wherein the snap-fit end comprises a snap portion displaced off of a curved portion that extends along a majority of the front side of the lid apparatus.

16. The apparatus of claim 1, wherein the auxiliary port is dimensioned to allow injection of a reagent therethrough into a chamber of a multi-chambered container when the lid apparatus is in the closed configuration and sealingly attached to the multi-chambered container.

17. The apparatus of claim 1, wherein the plurality of walls defining separate cavities form a central cylindrical cavity and a plurality of petal shaped cavities extending from the central cylindrical cavity.

18. The apparatus of claim 17, wherein the plurality of walls defining separate cavities further form a plurality of wedge shaped cavities.

19. An apparatus comprising:
- a top lid having a plurality of openings, wherein the top lid includes a hinged end and a snap-fit end; and
- a bottom-cap hingedly attached to the top lid, the bottom-cap comprising an upper side and a lower side, wherein the upper side comprises:
  - a plurality of openings, each having a surrounding lip upwardly extending from a lower surface of the upper side, wherein each opening is smaller than and mates with a corresponding opening of the top lid, and
  - at least one auxiliary port disposed between opening of the plurality of openings and having an opening larger than a corresponding opening of the top lid to facilitate injection of an additional reagent therethrough when the lid apparatus is in the closed configuration and sealingly attached to a multi-chambered container;
- wherein the lower side of the bottom-cap comprises:
  - a lower side main surface; and
  - an outermost edge extending downward from the lower side main surface,
- wherein in an open configuration the top lid is hinged away from the bottom-cap, and wherein in a closed configuration the top lid is engaged with the bottom-cap, wherein in the closed configuration the snap-fit end of the top lid engages a snap portion of the outermost edge of the lower side of the bottom-cap.

20. The apparatus of claim 19, wherein the at least one auxiliary port comprises a non-circular shape.

* * * * *